(12) United States Patent
Auerbach et al.

(10) Patent No.: US 12,276,988 B2
(45) Date of Patent: *Apr. 15, 2025

(54) SYSTEM AND METHOD FOR THE AUTONOMOUS TRANSITION OF AN ELECTRIC VERTICAL TAKEOFF AND LANDING AIRCRAFT

(71) Applicant: BETA AIR, LLC, South Burlington, VT (US)

(72) Inventors: Joshua E. Auerbach, Waterbury Center, VT (US); Nicholas Moy, Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,184

(22) Filed: Oct. 30, 2023

(65) Prior Publication Data

US 2024/0061447 A1 Feb. 22, 2024

Related U.S. Application Data

(63) Continuation of application No. 17/871,017, filed on Jul. 22, 2022, now Pat. No. 11,835,969, which is a continuation of application No. 17/404,423, filed on Aug. 17, 2021, now Pat. No. 11,435,762.

(51) Int. Cl.
| | |
|---|---|
| *G06F 17/00* | (2019.01) |
| *B64C 29/00* | (2006.01) |
| *B64D 27/24* | (2006.01) |
| *G05D 1/00* | (2006.01) |

(52) U.S. Cl.
CPC ......... *G05D 1/102* (2013.01); *B64C 29/0025* (2013.01); *B64D 27/24* (2013.01)

(58) Field of Classification Search
CPC .. G05D 1/102; B64C 29/0025; B64C 13/506; B64D 27/24
USPC .......................................................... 701/4
See application file for complete search history.

(56) References Cited

U.S. PATENT DOCUMENTS

| | | | |
|---|---|---|---|
| 6,293,491 | B1 | 9/2001 | Wobben |
| 7,267,300 | B2 | 9/2007 | Heath et al. |
| 8,540,183 | B2 | 9/2013 | Morris et al. |
| 9,096,314 | B2 | 8/2015 | Brotherton-Ratcliffe et al. |

(Continued)

OTHER PUBLICATIONS

A Robust Uniform Control Approach for VTOL Aircraft (Year: 2021).*

(Continued)

*Primary Examiner* — Ronnie M Mancho
(74) *Attorney, Agent, or Firm* — Lee & Hayes, P.C.

(57) ABSTRACT

A system for autonomous flight of an electric vertical takeoff and landing (eVTOL) aircraft. The system may include a pusher component, a lift component, a flight controller, and a pilot override switch. The pusher component is mechanically coupled to the eVTOL aircraft. The lift component is mechanically coupled to the eVTOL aircraft. The flight controller is communicatively connected to the pilot override switch. The flight controller is configured to identify a transition point, initiate operation of the pusher component, and terminate operation of the lift component. A method for flight control of an eVTOL aircraft is also provided.

20 Claims, 7 Drawing Sheets

(56) References Cited

U.S. PATENT DOCUMENTS

| | | | |
|---|---|---|---|
| 9,242,728 B2 | 1/2016 | Morrison | |
| 9,845,150 B2 | 12/2017 | Kroo | |
| 9,994,313 B2 | 6/2018 | Claridge et al. | |
| 10,144,509 B2 | 12/2018 | Cruz Ayoroa | |
| 10,272,995 B2 | 4/2019 | Leng | |
| 10,752,372 B2 | 8/2020 | Senkel et al. | |
| 10,926,874 B2 | 2/2021 | Giannini et al. | |
| 10,994,838 B2 | 5/2021 | Delorean | |
| 11,435,761 B1 * | 9/2022 | Wiegman | B64C 29/0033 |
| 11,435,762 B1 * | 9/2022 | Auerbach | B64C 29/0025 |
| 11,691,730 B1 * | 7/2023 | Moy | B64C 29/00 244/76 R |
| 11,829,160 B2 * | 11/2023 | Cutler | G05D 1/085 |
| 11,835,969 B2 * | 12/2023 | Auerbach | B64C 13/506 |
| 11,845,551 B2 * | 12/2023 | Ferrier | G05B 13/0265 |
| 11,945,597 B2 * | 4/2024 | Bower | B64D 31/02 |
| 2013/0134264 A1 | 5/2013 | Carter, Jr. et al. | |
| 2019/0291862 A1 | 9/2019 | Lyasoff et al. | |
| 2019/0329868 A1 | 10/2019 | Morrison | |
| 2021/0150919 A1 | 5/2021 | Schaferlein | |
| 2023/0023907 A1 * | 1/2023 | Wiegman | B64C 13/505 |
| 2023/0054436 A1 * | 2/2023 | Auerbach | B64C 29/0025 |
| 2024/0061447 A1 * | 2/2024 | Auerbach | G05D 1/102 |

OTHER PUBLICATIONS

System Identification and Handling Qualities Predictions of an eVTOL (Year: 2020).*

Xichen Shi, Intelligent Control for Fixed-Wing eVTOL Aircraft, Dec. 31, 2021.

Ferit, Cakici; Kemal, Leblebicioglu, Control System Design of a Vertical Take-off and Landing Fixed-Wing UAV, Aug. 9, 2016.

* cited by examiner

SYSTEM AND METHOD FOR THE AUTONOMOUS TRANSITION OF AN ELECTRIC VERTICAL TAKEOFF AND LANDING AIRCRAFT

CROSS-REFERENCE TO RELATED APPLICATIONS

This application is a continuation of Non-provisional application Ser. No. 17/404,423 filed on Aug. 17, 2021 and entitled "SYSTEM AND METHOD FOR THE AUTONOMOUS TRANSITION OF AN ELECTRIC VERTICAL TAKEOFF AND LANDING AIRCRAFT," the entirety of which is incorporated herein by reference.

FIELD OF THE INVENTION

The present invention generally relates to the field of electric aircraft. In particular, the present invention is directed to a system and method for the autonomous transition of an electric vertical takeoff and landing (eVTOL) aircraft.

BACKGROUND

The autonomous transition of eVTOL aircraft can be complicated due to the different modes of flight involved. This can cause difficulties for pilots to smoothly and safely handle the transition between vertical and horizontal flight of eVTOL aircraft.

SUMMARY OF THE DISCLOSURE

In an aspect, a system for flight control of an electric vertical takeoff and landing (eVTOL) aircraft, the system including a horizontal thrust component attached to an eVTOL aircraft, a lift component attached to the eVTOL aircraft, and a pilot override switch, wherein the pilot override switch is operable by a pilot of the eVTOL aircraft and is configured to alter control of the eVTOL aircraft. The system also including a flight controller communicatively connected to the pilot override switch, wherein the flight controller is configured to initiate autonomous flight of the eVTOL, identify a flight transition point, initiate operation of the horizontal thrust component as a function of the flight transition point, adjust an attitude of the eVTOL aircraft by modulating at least a control surface, initiate modulation of the lift component, and receive a pilot override signal from the pilot override switch, wherein the pilot override signal transitions the eVTOL from the autonomous maneuver to full control by the pilot.

In another aspect, a method for flight control of an electric vertical takeoff and landing (eVTOL) aircraft, the method including initiating, by a flight controller incorporated in an eVTOL aircraft, autonomous flight of an eVTOL. The method further including identifying, by the flight controller, a flight transition point. The method further including initiating, by the flight controller, operation of a horizontal thrust component mechanically coupled to the eVTOL aircraft as a function of the flight transition point. The method further including adjusting, by the flight controller, an attitude of the eVTOL aircraft by modulating at least a control surface. The method further including initiating, by the flight controller, modulation of a lift component mechanically coupled to the eVTOL aircraft. The method further including receiving, by the flight controller, a pilot override signal from a pilot override switch, wherein a pilot override signal transitions the eVTOL from the autonomous flight to full control by the pilot.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For illustrating the invention, the drawings show aspects of one or more embodiments of the invention. However, the present invention is not limited to the precise arrangements and instrumentalities shown in the drawings, wherein.

Figure 1:
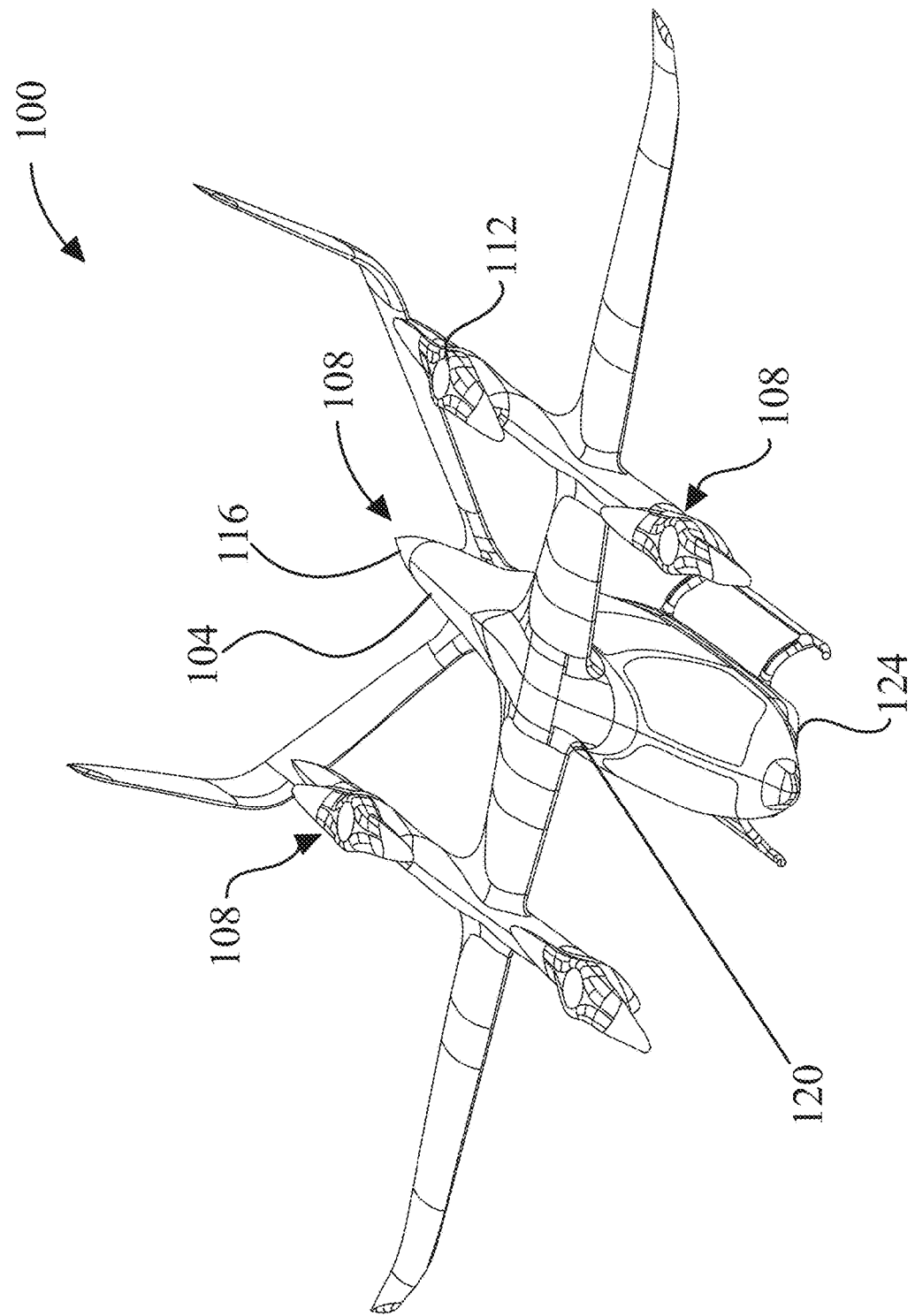
FIG. 1 is a diagrammatic representation of an exemplary embodiment of an electric aircraft.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. The implementations described below are exemplary implementations provided to enable persons skilled in the art to make or use embodiments of the disclosure and are not intended to limit the scope of the disclosure, which is defined by the claims. For purposes of description herein, the terms "upper", "lower", "left", "rear", "right", "front", "vertical", "horizontal", "upward", "downward", "forward", "backward" and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for flight control. In an embodiment, systems and methods are provided for flight control of an electric vertical takeoff and landing (eVTOL) aircraft. Aspects of the present disclosure can be used to provide an autonomous transition between vertical lift flight and fixed wing flight of an eVTOL aircraft. Aspects of the present disclosure can also be used to make this transition after takeoff and initial ascent, and before final descent and landing. This is so, at least in part, because an aircraft flight controller is configured to translate a preplanned trajectory to appropriate torque generation in an aircraft pusher component and an aircraft lift component. Aspects of the present disclosure advantageously allow for a smooth and safe autonomous transition between vertical lift flight and fixed wing flight. Exemplary embodiments illustrating aspects of the present disclosure are described below in the context of several specific examples.

Referring now to FIG. 1, an exemplary embodiment of an aircraft 100 including a system for flight control is illustrated. In an embodiment, the aircraft 100 is an electric vertical takeoff and landing (eVTOL) aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

Still referring to FIG. 1, aircraft 100, may include a fuselage 104, a flight component 108 (or one or more flight components 108), and/or a flight controller 124. In one embodiment, flight component(s) 108, a lift component 112, and a pusher component 116.

As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power the aircraft. To optimize the power and energy necessary to propel the aircraft, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers comprises the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque comprises only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which may include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 1, aircraft 100 may include a plurality of flight components 108. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, in an embodiment, plurality of flight components 108 of aircraft 100 may include at least a lift component 112 and at least a pusher component 116 which are described in further detail later herein with reference to FIG. 2.

With continued reference to FIG. 1, in an embodiment, aircraft 100 may include a flight controller 124. Flight controller 124 may be implemented, without limitation, as described in further details below. In embodiments, flight controller 124 may be installed in an aircraft, may control aircraft remotely, and/or may include an element installed in aircraft and a remote element in communication therewith. Flight controller 124, in an embodiment, is located within the fuselage 104 of the aircraft. In accordance with some embodiments, flight controller is configured to operate a vertical lift flight (upwards or downwards, that is, takeoff or landing), a fixed wing flight, a transition between a vertical lift flight and a fixed wing flight, and a combination of a vertical lift flight and a fixed wing flight.

Still referring to FIG. 1, in an embodiment, and without limitation, flight controller 124 may be configured to operate aircraft according to a fixed-wing flight capability. A "fixed-wing flight capability," as used in this disclosure, is a method of flight wherein plurality of laterally extending elements generate lift. For example, and without limitation, fixed-wing flight capability may generate lift as a function of an airspeed of aircraft 100 and one or more airfoil shapes of laterally extending elements, wherein an airfoil is described above in detail. As a further non-limiting example, flight controller 124 may operate fixed-wing flight capability as a function of reducing applied torque on lift propulsor component 112. For example, and without limitation, flight controller 124 may reduce a torque of 9 Nm applied to a first set of lift propulsor components to a torque of 2 Nm. As a further non-limiting example, flight controller 124 may reduce a torque of 12 Nm applied to a first set of lift propulsor components to a torque of 0 Nm. In an embodiment, and without limitation, flight controller 124 may produce fixed-wing flight capability as a function of increasing forward thrust exerted by pusher component 116. For example, and without limitation, flight controller 124 may increase a forward thrust of 100 kN produced by pusher component 116 to a forward thrust of 569 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 100. Inertia compensator may alternatively or additionally include any computing device used as an inertia compensator as described in U.S. Nonprovisional application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference.

In an embodiment, and still referring to FIG. 1, flight controller 124 may be configured to perform a reverse thrust command. As used in this disclosure a "reverse thrust command" is a command to perform a thrust that forces a medium towards the relative air opposing aircraft 100. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

Figure 2:
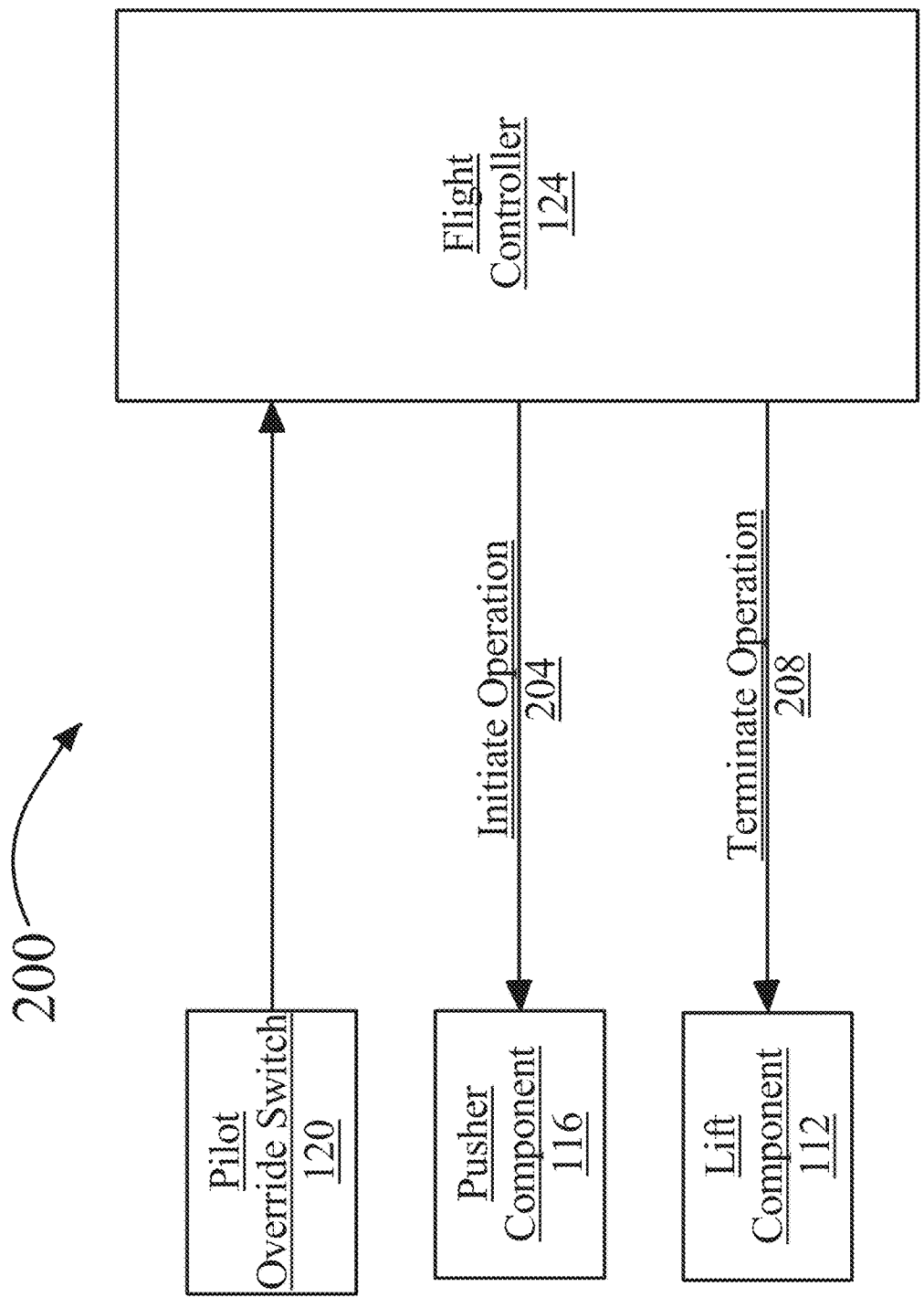
FIG. 2 illustrates a block diagram of an exemplary embodiment of a system for autonomous transition of an electric vertical takeoff and landing (eVTOL) aircraft.

Referring now to FIG. 2, an exemplary embodiment of a system 200 for autonomous transition of an electric vertical takeoff and landing (eVTOL) aircraft, such as without limitation an aircraft 100 of FIG. 1, is illustrated. System 200 may include a pusher component 116, a lift component 112, and a flight controller 124.

Still referring to FIG. 2, pusher component 116 may include at least a propulsor. Pusher component 116 may be configured to generate a generally forward thrust for the eVTOL aircraft. Lift component 112 may include at least a propulsor. Lift component 112 may be configured to generate a generally upward thrust for the eVTOL aircraft. Flight controller 124 may include a computing device. Flight controller may include a proportional-integral-derivative (PID) controller. Flight controller may be configured to increase a rotational speed of pusher component 116 and decrease a rotational speed of lift component 112.

Still referring to FIG. 2, pusher component 116 may include a propulsor, a propeller, a blade, a motor, a rotor, a rotating element, an aileron, a rudder, arrangements thereof, combinations thereof, and the like. Each pusher component 116, when a plurality is present, of the plurality of flight components 108 (see FIG. 1) is configured to produce, in an embodiment, substantially forward and/or horizontal thrust such that the aircraft moves forward.

Still referring to FIG. 2, as used in this disclosure a "pusher component" is a component that pushes and/or thrusts an aircraft through a medium. As a non-limiting example, pusher component 116 may include a pusher propeller, a paddle wheel, a pusher motor, a pusher propulsor, and the like. Additionally, or alternatively, pusher flight component may include a plurality of pusher flight components. Pusher component 116 is configured to produce a forward thrust. As a non-limiting example, forward thrust may include a force of 1145 N to force aircraft to in a horizontal direction along longitudinal axis. As a further non-limiting example, forward thrust may include a force of, as a non-limiting example, 300 N to force aircraft 100 in a horizontal direction along a longitudinal axis. As a further non-limiting example, pusher component 116 may twist and/or rotate to pull air behind it and, at the same time, push aircraft 100 forward with an equal amount of force. In an embodiment, and without limitation, the more air forced behind aircraft, the greater thrust force with which the aircraft is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 2, lift component 112 may include a propulsor, a propeller, a blade, a motor, a rotor, a rotating element, an aileron, a rudder, arrangements thereof, combinations thereof, and the like. Each lift component 112, when a plurality is present, of the plurality of flight components 108 (see FIG. 1) is configured to produce, in an embodiment, substantially upward and/or vertical thrust such that aircraft moves upward.

Still referring to FIG. 2, As used in this disclosure a "lift component" is a component and/or device used to propel a craft upward by exerting downward force on a fluid medium, which may include a gaseous medium such as air or a liquid medium such as water. Lift component 112 may include any device or component that consumes electrical power on demand to propel an electric aircraft in a direction or other vehicle while on ground or in-flight. For example, and without limitation, lift component 112 may include a rotor, propeller, paddle wheel and the like thereof, wherein a rotor is a component that produces torque along the longitudinal axis, and a propeller produces torquer along the vertical axis. In an embodiment, lift component 112 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 112 may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 9.7° and a relative wind angle 6.5°. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and rotational velocity direction. For example, and without limitation, fixed pitch angle may include 18°. In another embodiment fixed angle of attack may be manually variable to a few set positions to adjust one or more lifts of aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 2, lift component 112 may be configured to produce a lift. As used in this disclosure a "lift" is a perpendicular force to the oncoming flow direction of fluid surrounding the surface. For example, and without limitation relative air speed may be horizontal to aircraft, wherein lift force may be a force exerted in a vertical direction, directing the aircraft upwards. In an embodiment, and without limitation, lift component 112 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components 108 (FIG. 1) such as a power sources may apply a torque on lift component 112 to produce lift. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 2, system 200 may include a pilot override switch. Pilot override switch 120 may be attached to eVTOL aircraft. Pilot override switch 120 may be configured to alter control of aircraft 100 from autonomous to non-autonomous flight modes. As used in this disclosure, an "autonomous" mode is a mode in which aircraft 100 is configured to self-govern its own flight path and does not need a pilot to oversee flight controls. "Non-autonomous" refers to a mode of flight where a pilot is needed to control flight components.

Still referring to FIG. 2, as used in this disclosure, a "pilot override switch" is a mechanism or means which allows a pilot to take control of flight components (for example, and without limitation, pusher component and lift component) of an aircraft. For example, and without limitation, pilot override switch 120 may include push buttons, lever, switch, and other binary inputs. Pilot override switch 120 is configured to translate a pilot's desire to take back control of each flight component of the plurality of flight components, such as and without limitation, pusher component 116 and lift component 112. Pilot override switch 120 is configured to regain control of autonomous aircraft 100 and its flight component(s) 108.

Still referring to FIG. 2, aircraft and/or flight controller may be configured to transition from vertical lift flight to fixed wing flight. As used in this disclosure, "vertical lift flight" refers to the substantially vertical, upward, or downward, flight of aircraft. As used in this disclosure, "fixed wing flight" refers to the substantially horizontal, forward, or backward, flight of aircraft. "Transition", as used in this disclosure, refers to the transition of aircraft's trajectory between vertical lift flight and fixed wing flight. Transition from vertical lift flight to fixed wing flight may occur at or after a moment when aircraft's speed is such as to avoid stall; that is, the aircraft's speed maybe at least at or above, a stall speed. As used in this disclosure, "stall speed" is a metric that refers to the minimum speed for an aircraft to produce lift. For example, when airplanes fly slower than their respective stall speed, they may be unable to produce lift.

Still referring to FIG. 2, aircraft and/or system 200 may include a power source. Power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 2, an energy source may be used to provide a steady supply of electrical power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, an energy source may be capable of providing sufficient electrical power for auxiliary loads including without limitation, lighting, navigation, communications, de-icing, steering, or other systems requiring power or energy. Further, an energy source may be capable of providing sufficient power for controlled descent and landing protocols, including, without limitation, hovering descent, or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease because of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source may include a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

In an embodiment and still referring to FIG. 2, a plurality of lift components 112 of the plurality of flight components 108 (FIG. 1) may be arranged in a quad copter orientation. As used in this disclosure a "quad copter orientation" is at least a lift component oriented in a geometric shape and/or pattern, wherein each of the lift components is located along a vertex of the geometric shape. For example, and without limitation, a square quad copter orientation may have four lift propulsor components oriented in the geometric shape of a square, wherein four lift propulsor components are located along four vertices of the square shape. As a further non-limiting example, a hexagonal quad copter orientation may have six lift components oriented in the geometric shape of a hexagon, wherein six lift components are located along six vertices of the hexagon shape. In an embodiment, and without limitation, quad copter orientation may include a first set of lift components and a second set of lift components, wherein first set of lift components and second set of lift components may include two lift components each, wherein the first set of lift components and a second set of lift components are distinct from one another. For example, and without limitation, the first set of lift components may include two lift components that rotate in a clockwise direction, wherein the second set of lift propulsor components may include two lift components that rotate in a counterclockwise direction. In an embodiment, and without limitation, the first set of lift components may be oriented along a line oriented 45° from the longitudinal axis of aircraft 100 (FIG. 1). In another embodiment, and without limitation, the second set of lift components may be oriented along a line oriented 135° from the longitudinal axis, wherein the first set of lift components line and the second set of lift components are perpendicular to each other.

Still referring to FIG. 2, pusher component 116 and/or lift component 112 (of flight component(s) 108 (FIG. 1208 may include any such components and related devices as disclosed in U.S. Nonprovisional application Ser. No. 16/427,298, filed on May 30, 2019, entitled "SELECTIVELY DEPLOYABLE HEATED PROPULSOR SYSTEM," U.S. Nonprovisional application Ser. No. 16/703,225, filed on Dec. 4, 2019, entitled "AN INTEGRATED ELECTRIC PROPULSION ASSEMBLY," U.S. Nonprovisional application Ser. No. 16/910,255, filed on Jun. 24, 2020, entitled "AN INTEGRATED ELECTRIC PROPULSION ASSEMBLY," U.S. Nonprovisional application Ser. No. 17/319,155, filed on May 13, 2021, entitled "AIRCRAFT HAVING REVERSE THRUST CAPABILITIES," U.S. Nonprovisional application Ser. No. 16/929,206, filed on Jul. 15, 2020, entitled "A HOVER AND THRUST CONTROL ASSEMBLY FOR DUAL-MODE AIRCRAFT," U.S. Nonprovisional application Ser. No. 17/001,845, filed on Aug. 25, 2020, entitled "A HOVER AND THRUST CONTROL ASSEMBLY FOR DUAL-MODE AIRCRAFT," U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT," and U.S. Nonprovisional application Ser. No. 17/321,662, filed on May 17, 2021, entitled "AIRCRAFT FOR FIXED PITCH LIFT," the entirety of each one of which is incorporated herein by reference.

Still referring to FIG. 2, system may include flight controller 124. Flight controller 124 may be communicatively connected to pilot override switch 120. "Communicatively connected", for the purposes of this disclosure, refers to two or more components electrically, or otherwise connected or coupled and configured to transmit and receive signals from one another. Signals must include visuals and may include electrical, electromagnetic, audio, radio waves, combinations thereof, and the like, among others. Flight controller 124 may include any computing device and/or combination of computing devices programmed to operate aircraft, for instance and without limitation as described in further detail below.

Still referring to FIG. 2, in an embodiment, flight controller 124 may include a proportional-integral-derivative (PID) controller. Flight controller 124 is configured to initiate operation of pusher component 116 which, in an embodiment, may include initiating rotation of pusher component 116 such that the rotation of pusher component 116 generates forward or substantially horizontal thrust. Flight controller 124 is configured to terminate operation of lift component 112 which, in an embodiment, may include terminating rotation of lift component 112 (for example, by cutting power to it) such that lift component 112 and/or the aircraft no longer generates upward or substantially vertical thrust.

With continued reference to FIG. 2, flight controller 124 may be configured to detect when lift component 112 is activated autonomously and when it is switched off. Similarly, flight controller is configured to detect when pusher component 116 is activated autonomously and when it is switched off. Flight controller 124 is further configured to monitor the operations of lift component 112 and pusher component 116. Flight controller 124, in an embodiment, may be configured to estimate the stall speed of aircraft. Flight controller 124 may also be configured to provide stall speed data to the pilot, as needed or desired. During transition between vertical lift flight and fixed wing flight, flight controller may be configured to monitor the trajectory followed by aircraft as controlled by the predisposed trajectory. In embodiments in accordance with the present disclosure, the decisions to transition between vertical lift flight and fixed wing flight are preplanned. Aircraft may be equipped with visual guides for pilot. Some such suitable visual guides are described in in U.S. Nonprovisional application Ser. No. 17/362,001, filed on Jun. 29, 2021, entitled "SYSTEM FOR A GUIDANCE INTERFACE FOR A VERTICAL TAKE-OFF AND LANDING AIRCRAFT," the entirety of which is incorporated herein by reference.

Still referring to FIG. 2, in an embodiment, flight controller 124 is configured to monitor aircraft's flight conditions and operating parameters to ensure that they are within acceptable limits. These may include, for example and without limitation, aircraft's vertical lift, horizontal thrust, trajectory, speed, and the like, among others. Flight controller 124 may be configured to monitor such flight conditions and operating parameters based on current and/or projected responses to preplanned trajectory. In an embodiment, flight controller 124 may be configured to warn pilot of a potentially unacceptable pilot command and/or to override pilot's command, as needed or desired.

Still referring to FIG. 2, in an embodiment, flight controller 124 is configured to automatically perform flight maneuvers. For example, and without limitation, flight controller is configured to automatically transition between vertical lift flight and fixed wing flight.

Still referring to FIG. 2, flight controller 124 may include any of the flight controllers as disclosed in U.S. Nonprovisional application Ser. No. 16/929,206, filed on Jul. 15, 2020, entitled "A HOVER AND THRUST CONTROL ASSEMBLY FOR DUAL-MODE AIRCRAFT," U.S. Nonprovisional application Ser. No. 17/001,845, filed on Aug. 25, 2020, entitled "A HOVER AND THRUST CONTROL ASSEMBLY FOR DUAL-MODE AIRCRAFT," U.S. Nonprovisional application Ser. No. 17/321,662, filed on May 17, 2021, entitled "AIRCRAFT FOR FIXED PITCH LIFT," U.S. Nonprovisional application Ser. No. 17/218,387, filed on Mar. 31, 2021, entitled "METHOD AND SYSTEM FOR FLY-BY-WIRE FLIGHT CONTROL CONFIGURED FOR USE IN ELECTRIC AIRCRAFT," and U.S. Nonprovisional application Ser. No. 17/348,851 filed on Jun. 16, 2021, entitled "AIRCRAFT FOR VECTORING A PLURALITY OF PROPULSORS," the entirety of each one of which is incorporated herein by reference.

As used in this disclosure, "flight path angle" is the angle between the flight path vector of an aircraft and the horizon. Stated simply, flight path angle can also be described as the climb or descent angle. "Pitch angle" (or pitch attitude), as used in this disclosure, is the angle between the longitudinal axis of an aircraft (or component thereof) and the horizon. As used in this disclosure, "angle of attack" is the angle between the chord of an airfoil (or component thereof) and the relative wind. In other words, it can be approximated as the difference between pitch angle and flight path angle.

Figure 3:
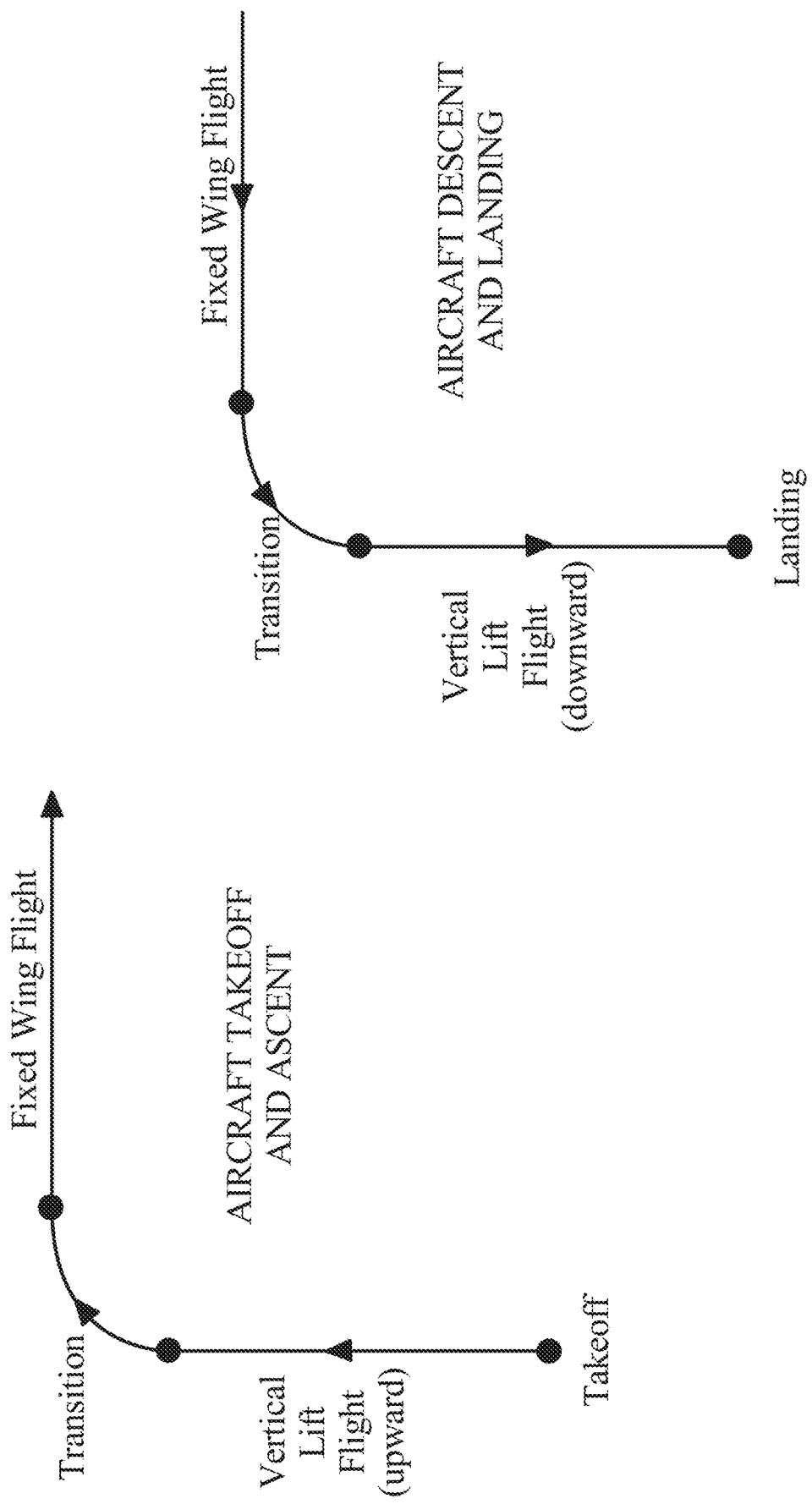
FIG. 3 is a schematic diagram of exemplary embodiments of simplified flight paths for an eVTOL aircraft during takeoff and landing.

Referring now to FIG. 3, a schematic diagram of exemplary embodiments of simplified flight paths for an eVTOL aircraft during takeoff and landing is shown. During aircraft takeoff and ascent, a vertical lift flight path (upward) is followed by a transition flight path which is then followed by a fixed wing flight path. During aircraft descent and landing a fixed wing flight path is followed by a transition flight path which is then followed by a vertical lift flight path (downward). This execution of a desired flight trajectory may be accomplished by an autonomous transition between vertical lift flight and fixed wing flight. Flight trajectory may be stored in the memory of flight controller 124, for instance and without limitation as described in further detail below. In an embodiment, a flight controller is configured to translate a preplanned trajectory to appropriate torque generation in an aircraft pusher component and an aircraft lift component, as described in greater detail above and later herein.

Figure 4:
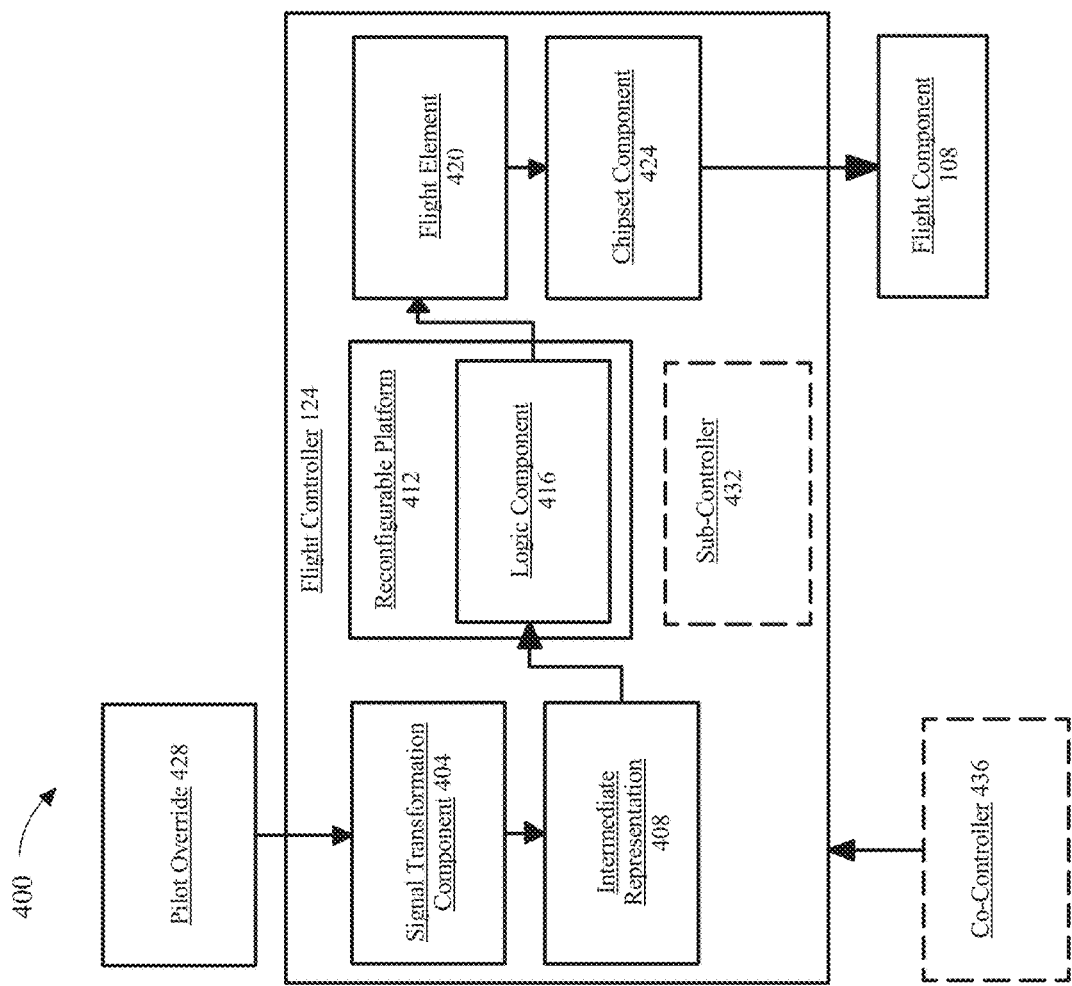
FIG. 4 is a block diagram of an exemplary embodiment of a flight controller.

Now referring to FIG. 4, an exemplary embodiment 400 of a flight controller 100 is illustrated. As used in this disclosure a "flight controller" is a computing device of a plurality of computing devices dedicated to data storage, security, distribution of traffic for load balancing, and flight instruction. Flight controller 124 may include and/or communicate with any computing device as described in this disclosure, including without limitation a microcontroller, microprocessor, digital signal processor (DSP) and/or system on a chip (SoC) as described in this disclosure. Further, flight controller 124 may include a single computing device operating independently, or may include two or more computing device operating in concert, in parallel, sequentially or the like; two or more computing devices may be included together in a single computing device or in two or more computing devices. In embodiments, flight controller 124 may be installed in an aircraft, may control aircraft remotely, and/or may include an element installed in the aircraft and a remote element in communication therewith.

In an embodiment, and still referring to FIG. 4, flight controller 124 may include a signal transformation component 404. As used in this disclosure a "signal transformation component" is a component that transforms and/or converts a first signal to a second signal, wherein a signal may include one or more digital and/or analog signals. For example, and without limitation, signal transformation component 404 may be configured to perform one or more operations such as preprocessing, lexical analysis, parsing, semantic analysis, and the like thereof. In an embodiment, and without limitation, signal transformation component 404 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 404 may include transforming one or more low-level languages such as, but not limited to, machine languages and/or assembly languages. For example, and without limitation, signal transformation component 404 may include transforming a binary language signal to an assembly language signal. In an embodiment, and without limitation, signal transformation component 404 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 404 may be configured to optimize an intermediate representation 408. As used in this disclosure an "intermediate representation" is a data structure and/or code that represents the input signal. Signal transformation component 404 may optimize intermediate representation as a function of a data-flow analysis, dependence analysis, alias analysis, pointer analysis, escape analysis, and the like thereof. In an embodiment, and without limitation, signal transformation component 404 may optimize intermediate representation 408 as a function of one or more inline expansions, dead code eliminations, constant propagation, loop transformations, and/or automatic parallelization functions. In another embodiment, signal transformation component 404 may optimize intermediate representation as a function of a machine dependent optimization such as a peephole optimization, wherein a peephole optimization may rewrite short sequences of code into more efficient sequences of code. Signal transformation component 404 may optimize intermediate representation to generate an output language, wherein an "output language," as used herein, is the native machine language of flight controller 124. For example, and without limitation, native machine language may include one or more binary and/or numerical languages.

In an embodiment, and without limitation, signal transformation component 404 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 124 may include a reconfigurable hardware platform 412. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 412 may be reconfigured to enact any algorithm and/or algorithm selection process received from another computing device and/or created using machine-learning processes.

Still referring to FIG. 4, reconfigurable hardware platform 412 may include a logic component 416. As used in this disclosure a "logic component" is a component that executes instructions on output language. For example, and without limitation, logic component may perform basic arithmetic, logic, controlling, input/output operations, and the like thereof. Logic component 416 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 416 may be organized according to Von Neumann and/or Harvard architecture as a non-limiting example. Logic component 416 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 416 may include one or more integrated circuit microprocessors, which may contain one or more central processing units, central processors, and/or main processors, on a single metal-oxide-semiconductor chip. Logic component 416 may be configured to execute a sequence of stored instructions to be performed on the output language and/or intermediate representation 408. Logic component 416 may be configured to fetch and/or retrieve instruction from a memory cache, wherein a "memory cache," as used in this disclosure, is a stored instruction set on flight controller 124. Logic component 416 may be configured to decode instruction retrieved from memory cache to opcodes and/or operands. Logic component 416 may be configured to execute instruction on intermediate representation 408 and/or output language. For example, and without limitation, logic component 416 may be configured to execute an addition operation on intermediate representation 408 and/or output language.

In an embodiment, and without limitation, logic component 416 may be configured to calculate a flight element 420. As used in this disclosure a "flight element" is an element of datum denoting a relative status of aircraft. For example, and without limitation, flight element 420 may denote one or more torques, thrusts, airspeed velocities, forces, altitudes, groundspeed velocities, directions during flight, directions facing, forces, orientations, and the like thereof. For example, and without limitation, flight element 420 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 420 may denote that aircraft is following a flight path accurately and/or sufficiently.

Still referring to FIG. 4, flight controller 124 may include a chipset component 424. As used in this disclosure a "chipset component" is a component that manages data flow. In an embodiment, and without limitation, chipset component 424 may include a northbridge data flow path, wherein northbridge dataflow path may manage data flow from logic component 416 to a high-speed device and/or component, such as a RAM, graphics controller, and the like thereof. In another embodiment, and without limitation, chipset component 424 may include a southbridge data flow path, wherein southbridge dataflow path may manage data flow from logic component 416 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 424 may manage data flow between logic component 416, memory cache, and a flight component 108. As used in this disclosure a "flight component" is a portion of an aircraft that can be moved or adjusted to affect one or more flight elements. For example, flight component 108 may include a component used to affect aircrafts' roll and pitch which may comprise one or more ailerons. As a further example, flight component 108 may include a rudder to control yaw of an aircraft. In an embodiment, chipset component 424 may be configured to communicate with a plurality of flight components as a function of flight element 420. For example, and without limitation, chipset component 424 may transmit to an aircraft rotor to reduce torque of a first lift propulsor and increase the forward thrust produced by a pusher component to perform a flight maneuver.

In an embodiment, and still referring to FIG. 4, flight controller 124 is configured generate an autonomous function. As used in this disclosure an "autonomous function" is a mode and/or function of flight controller 124 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 420. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 124 will adjust aircraft. As used in this disclosure a "semi-autonomous mode" is a mode that automatically adjusts and/or controls a portion and/or section of aircraft.

In an embodiment, and still referring to FIG. 4, flight controller 124 generates autonomous function as a function of an autonomous machine-learning model. As used in this disclosure an "autonomous machine-learning model" is a machine-learning model to produce an autonomous function output given flight element 420 and pilot override 428 as inputs; this is in contrast to a non-machine learning software program where the commands to be executed are determined in advance by a user and written in a programming language. As used in this disclosure a "pilot override switch" is an element of datum representing one or more functions a pilot does to claim flight control of aircraft 100. For example, pilot override 428 may denote that a pilot is gaining control and/or maneuvering ailerons, rudders and/or propulsors. In an embodiment, pilot override 428 must include an implicit signal and/or an explicit signal. For example, and without limitation, pilot override 428 may include an explicit signal, wherein pilot explicitly states desire for control. As a further non-limiting example, pilot override 428 may include an explicit signal directing flight controller 124 to control and/or maintain entire aircraft, and/or entire flight plan. As a further non-limiting example, pilot override 428 may include an implicit signal, wherein flight controller 124 detects a malfunction, torque alteration, flight path deviation, and the like thereof. In an embodiment, and without limitation, pilot override 428 may include one or more explicit signals to reduce torque, and/or one or more implicit signals that torque may be reduced due to reduction of airspeed velocity. In an embodiment, and without limitation, pilot override 428 may include one or more local and/or global signals. For example, and without limitation, pilot override 428 may include a local signal that is transmitted by a pilot and/or crew member. As a further non-limiting example, pilot override 428 may include a global signal that is transmitted by air traffic control and/or one or more remote users that are in communication with pilot of aircraft.

Still referring to FIG. 4, autonomous machine-learning model may include one or more autonomous machine-learning processes such as supervised, unsupervised, or reinforcement machine-learning processes that flight controller 124 and/or a remote device may or may not use in the generation of autonomous function. As used in this disclosure "remote device" is an external device to flight controller 124. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that may include a semi-autonomous mode to increase thrust of propulsors. Autonomous training data may be received as a function of user-entered valuations of flight elements, pilot signals, simulation data, and/or autonomous functions. Flight controller 124 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot override, and/or simulation data to an autonomous function. Autonomous training data may be received in the form of one or more user-entered correlations of a flight element, pilot override, and/or simulation data to an autonomous function.

Still referring to FIG. 4, flight controller 124 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor, and the like thereof. Remote device and/or FPGA may perform autonomous machine-learning process using autonomous training data to generate autonomous function and transmit output to flight controller 124. Remote device and/or FPGA may transmit a signal, bit, datum, or parameter to flight controller 124 that at least relates to autonomous function. Additionally or alternatively, remote device and/or FPGA may provide an updated machine-learning model. For example, and without limitation, an updated machine-learning model may be comprised of a firmware update, a software update, an autonomous machine-learning process correction, and the like thereof. As a non-limiting example, a software update may incorporate a new simulation data that relates to a modified flight element. Additionally or alternatively, the updated machine learning model may be transmitted to remote device and/or FPGA, wherein remote device and/or FPGA may replace autonomous machine-learning model with updated machine-learning model and generate the autonomous function as a function of flight element, pilot override, and/or simulation data using the updated machine-learning model. Updated machine-learning model may be transmitted by remote device and/or FPGA and received by flight controller 124 as a software update, firmware update, or corrected autonomous machine-learning model. For example, and without limitation autonomous machine learning model may utilize a neural net machine-learning process, wherein updated machine-learning model may incorporate a gradient boosting machine-learning process.

Still referring to FIG. 4, flight controller 124 may include, be included in, and/or communicate with a mobile device such as a mobile telephone or smartphone. Further, flight controller may communicate with one or more additional devices as described below in further detail via a network interface device. Network interface device may be utilized for commutatively connecting a flight controller to one or more of a variety of networks, and one or more devices. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. Network may include any network topology and can may employ a wired and/or a wireless mode of communication.

In an embodiment, and still referring to FIG. 4, flight controller 124 may include, but is not limited to, for example, a cluster of flight controllers in a first location and a second flight controller or cluster of flight controllers in a second location. Flight controller 124 may include one or more flight controllers dedicated to data storage, security, distribution of traffic for load balancing, and the like. Flight controller 124 may be configured to distribute one or more computing tasks as described below across a plurality of flight controllers, which may operate in parallel, in series, redundantly, or in any other manner used for distribution of tasks or memory between computing devices. For example, and without limitation, flight controller 124 may implement a control algorithm to distribute and/or command plurality of flight controllers. As used in this disclosure a "control algorithm" is a finite sequence of well-defined computer implementable instructions that may determine flight component of plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive one or more segmentation boundaries. In an embodiment, and without limitation, creating optimized signal communication further comprises separating a plurality of signal codes across plurality of flight controllers. For example, and without limitation, plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, plurality of flight controllers may include a chain path, wherein a "chain path," as used herein, is a linear communication path comprising a hierarchy that data may flow through. In an embodiment, and without limitation, plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 124. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or master bus controller. In an embodiment, master bus controller may be configured to perform bus arbitration. As used in this disclosure "bus arbitration" is method and/or scheme to prevent multiple buses from attempting to communicate with and/or connect to master bus controller. For example, and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 408 and/or output language from logic component 416, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between plurality of flight controllers. For example, and without limitation, priority packet may denote that a section of control algorithm should be used and/or is of greater priority than other sections.

Still referring to FIG. 4, flight controller 124 may also be implemented using a "shared nothing" architecture in which data is cached at the worker, in an embodiment, this may enable scalability of aircraft and/or computing device. Flight controller 124 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to input nodes, a suitable training algorithm (such as Levenberg-Marquardt, conjugate gradient, simulated annealing, or other algorithms) is then used to adjust connections and weights between nodes in adjacent layers of neural network to produce the desired values at output nodes. This process is sometimes referred to as deep learning.

Still referring to FIG. 4, a node may include, without limitation a plurality of inputs $x_i$ that may receive numerical values from inputs to a neural network containing node and/or from other nodes. Node may perform a weighted sum of inputs using weights $w_i$ that are multiplied by respective inputs $x_i$. Additionally or alternatively, a bias b may be added to the weighted sum of inputs such that an offset is added to each unit in neural network layer that is independent of input to the layer. Weighted sum may then be input into a function $\varphi$, which may generate one or more outputs y. Weight $w_i$ applied to an input $x_i$ may indicate whether input is "excitatory," indicating that it has strong influence on one or more outputs y, for instance by the corresponding weight having a large numerical value, and/or a "inhibitory," indicating it has a weak effect influence on one more inputs y, for instance by the corresponding weight having a small numerical value. Values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 432. As used in this disclosure a "sub-controller" is a controller and/or component that is part of a distributed controller as described above; for instance, flight controller 124 may be and/or include a distributed flight controller made up of one or more sub-controllers. For example, and without limitation, sub-controller 432 may include any controllers and/or components thereof that are similar to distributed flight controller and/or flight controller as described above. Sub-controller 432 may include any component of any flight controller as described above. Sub-controller 432 may be implemented in any manner suitable for implementation of a flight controller as described above. As a further non-limiting example, sub-controller 432 may include one or more processors, logic components and/or computing devices capable of receiving, processing, and/or transmitting data across distributed flight controller as described above. As a further non-limiting example, sub-controller 432 may include a controller that receives a signal from a first flight controller and/or first distributed flight controller component and transmits signal to a plurality of additional sub-controllers and/or flight components.

Still referring to FIG. 4, flight controller may include a co-controller 436. As used in this disclosure a "co-controller" is a controller and/or component that joins flight controller 124 as components and/or nodes of a distributer flight controller as described above. For example, and without limitation, co-controller 436 may include one or more controllers and/or components that are similar to flight controller 124. As a further non-limiting example, co-controller 436 may include any controller and/or component that joins flight controller 124 to distributer flight controller. As a further non-limiting example, co-controller 436 may include one or more processors, logic components and/or computing devices capable of receiving, processing, and/or transmitting data to and/or from flight controller 124 to distributed flight control system. Co-controller 436 may include any component of any flight controller as described above. Co-controller 436 may be implemented in any manner suitable for implementation of a flight controller as described above.

In an embodiment, and with continued reference to FIG. 4, flight controller 124 may be designed and/or configured to perform any method, method step, or sequence of method steps in any embodiment described in this disclosure, in any order and with any degree of repetition. For instance, flight controller 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing entirety of this disclosure, will be aware of various ways in which steps, sequences of steps, processing tasks, and/or data may be subdivided, shared, or otherwise dealt with using iteration, recursion, and/or parallel processing.

Figure 5:
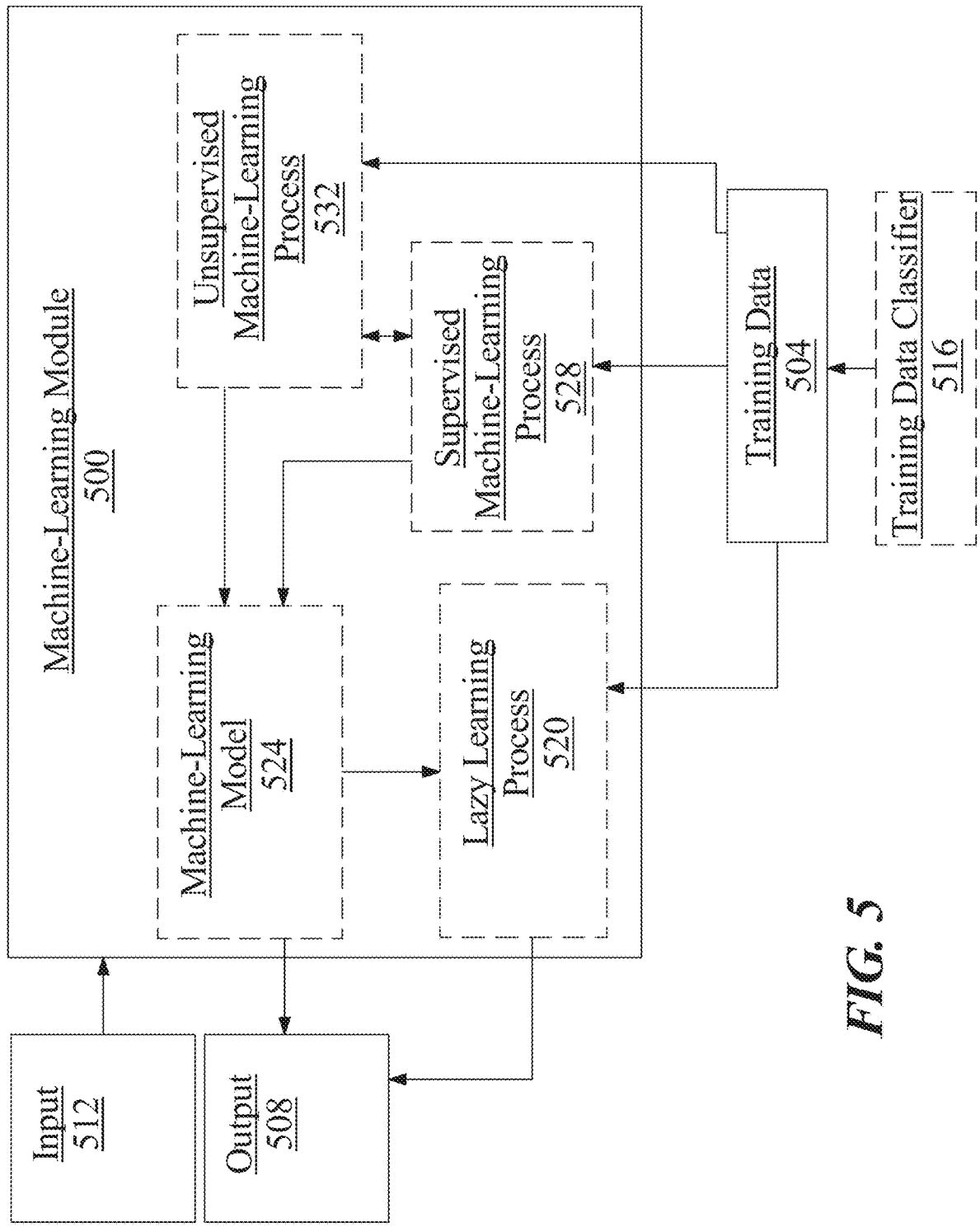
FIG. 5 is a block diagram of an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output is an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining input and training set to derive the algorithm to be used to produce output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via process of "training" the network, in which elements from a training data 504 set are applied to input nodes, a suitable training algorithm (such as Levenberg-Marquardt, conjugate gradient, simulated annealing, or other algorithms) is then used to adjust connections and weights between nodes in adjacent layers of neural network to produce desired values at output nodes. This process is sometimes referred to as deep learning.

Still referring to FIG. 5, machine-learning algorithms may include at least a supervised machine-learning process 528. At least a supervised machine-learning process 528, as defined herein, may include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of resulting linear equation may be modified to improve minimization. Linear regression models may include ridge regression methods, where the function to be minimized may include the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
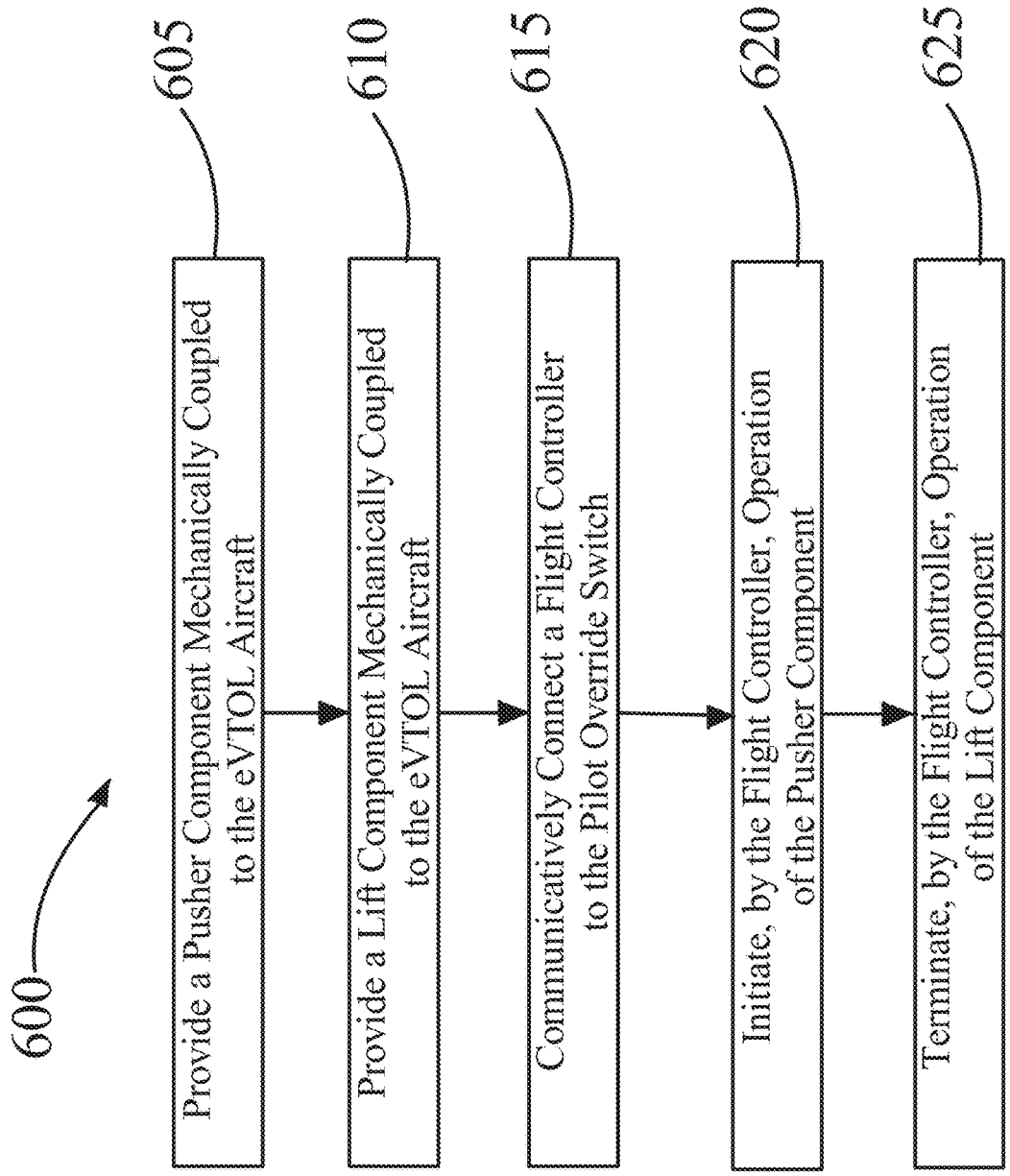
FIG. 6 is a block diagram of an exemplary embodiment of a method for flight control of an eVTOL aircraft.

Now referring to FIG. 6, an exemplary embodiment of a method 600 for flight control of an eVTOL aircraft. eVTOL aircraft may include, without limitation, any of the aircraft as disclosed herein and described above with reference to at least FIG. 1.

Still referring to FIG. 6, at step 605 a pusher component mechanically coupled to the eVTOL aircraft is provided. Pusher component may be any one of pusher components as disclosed herein and described above with reference to at least FIG. 1 and FIG. 2.

Still referring to FIG. 6, at step 610 a lift component mechanically coupled to the eVTOL aircraft is provided. Lift component may be any one of lift components as disclosed herein and described above with reference to at least FIG. 1 and FIG. 2.

Still referring to FIG. 6, at step 615 a flight controller is communicatively connected to pilot override switch. Pilot override switch as disclosed herein and described above with reference to at least FIG. 1 and FIG. 2. Flight controller may be any one of flight controllers as disclosed herein and described above with reference to at least FIG. 1, FIG. 2 and FIG. 4.

Still referring to FIG. 6, at step 620 operation of pusher component is initiated by flight controller. Pusher component may be any one of pusher components as disclosed herein and described above with reference to at least FIG. 1 and FIG. 2. Flight controller may be any one of flight controllers as disclosed herein and described above with reference to at least FIG. 1, FIG. 2 and FIG. 4.

Still referring to FIG. 6, at step 625 operation of lift component is terminated by flight controller. Lift component may be any one of lift components as disclosed herein and described above with reference to at least FIG. 1 and FIG. 2. Flight controller may be any one of the flight controllers as disclosed herein and described above with reference to at least FIG. 1, FIG. 2, and FIG. 4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium may include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, may include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device may include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
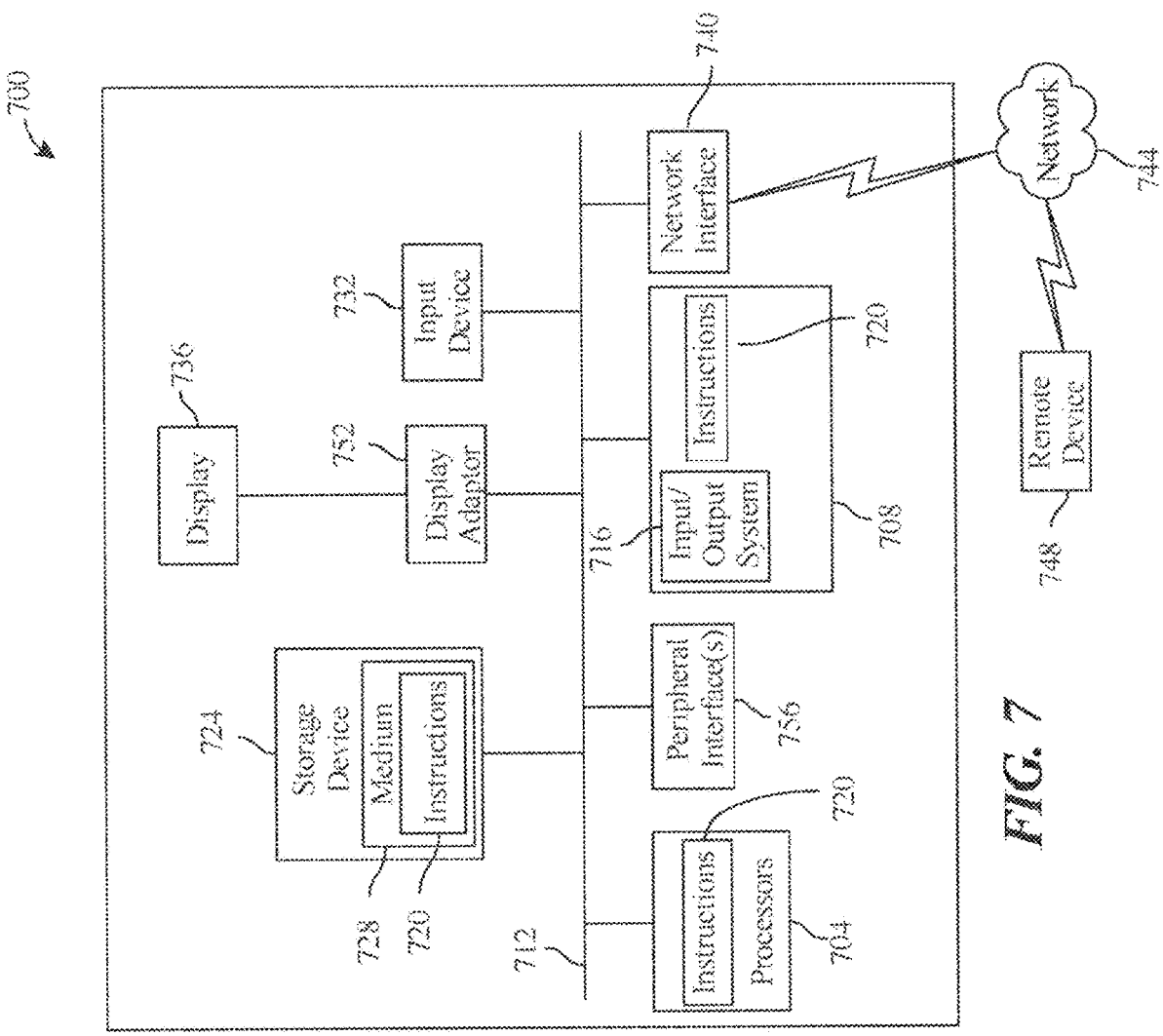
FIG. 7 is a block diagram of a computing system that can be used to implement any one or more of the methodologies disclosed herein and any one or more portions thereof.

FIG. 7 shows a diagrammatic representation of one embodiment of a computing device in exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 may include a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown 208. Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 708 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system comprising:
   an electric propulsion assembly attached to an electric aircraft;
   a pilot override configured to alter control of the electric aircraft; and
   a flight controller communicatively connected to the pilot override, wherein the flight controller is configured to:
   initiate autonomous flight of the electric aircraft;

control the electric propulsion assembly while the electric propulsion assembly produces thrust during the autonomous flight;

adjust an attitude of the electric aircraft by modulating at least one of the electric propulsion assembly or a control surface; and receive a pilot override signal from the pilot override, wherein the pilot override signal transitions the electric aircraft from the autonomous flight to control by a pilot.

2. The system of claim 1, wherein the flight controller is configured to access information associated with a trajectory from substantially vertical flight of the electric aircraft to substantially horizontal flight of the electric aircraft.

3. The system of claim 1, wherein the electric propulsion assembly comprises a horizontal thrust component.

4. The system of claim 3, wherein the horizontal thrust component is a pusher component.

5. The system of claim 1, wherein the electric propulsion assembly comprises a lift component configured to generate an upward thrust for the electric aircraft.

6. The system of claim 1, wherein the flight controller is configured to decrease a rotational speed of a lift component attached to the electric aircraft.

7. The system of claim 1, wherein the flight controller comprises a proportional-integral-derivative (PID) controller.

8. The system of claim 1, wherein the flight controller is further configured to increase a rotational speed of a horizontal thrust component attached to the electric aircraft.

9. The system of claim 1, wherein the flight controller is further configured to control the electric propulsion assembly while the electric aircraft follows a transition flight path.

10. The system of claim 1, wherein the control surface is an aileron.

11. A method comprising:

initiating, by a flight controller incorporated in an electric aircraft, autonomous flight of the electric aircraft;

controlling, by the flight controller, an electric propulsion assembly attached to the electric aircraft while the electric propulsion assembly produces thrust during the autonomous flight;

adjusting, by the flight controller, an attitude of the electric aircraft by modulating at least one of the electric propulsion assembly or a control surface; and receiving, by the flight controller, a pilot override signal from a pilot override switch, wherein the pilot override signal transitions the electric aircraft from the autonomous flight to control by a pilot.

12. The method of claim 11, further comprising accessing, by the flight controller, information associated with a trajectory from substantially vertical flight of the electric aircraft to substantially horizontal flight of the electric aircraft.

13. The method of claim 11, wherein the electric propulsion assembly comprises a horizontal thrust component.

14. The method of claim 13, wherein the horizontal thrust component is a pusher component.

15. The method of claim 11, wherein the electric propulsion assembly comprises a lift component configured to generate an upward thrust for the electric aircraft.

16. The method of claim 11, further comprising decreasing, by the flight controller, a rotational speed of a lift component.

17. The method of claim 11, wherein the flight controller comprises a proportional-integral-derivative (PID) controller.

18. The method of claim 11, further comprising:

increasing, by the flight controller, a rotational speed of a horizontal thrust component.

19. The method of claim 11, further comprising controlling, by the flight controller, the electric propulsion assembly while the electric aircraft follows a transition flight path.

20. The method of claim 11, wherein the control surface is an aileron.

* * * * *